United States Patent
Conner et al.

(10) Patent No.: US 6,414,593 B1
(45) Date of Patent: Jul. 2, 2002

(54) TILT-ACTIVATED TURN SIGNAL SHUT-OFF FOR MOTORCYCLES

(75) Inventors: Abe Andrew Conner, Novi; Vivek Sankar Narayanan, Troy; Paul Roger Strouse, Leslie, all of MI (US)

(73) Assignee: Yazaki North America ( * ) Notice: Subject to any disclaimer, the term of this patent is extended or adjusted under 35 U.S.C. 154(b) by 0 days.

(21) Appl. No.: 09/948,837

(22) Filed: Sep. 7, 2001

(51) Int. Cl.[7] ................................................ B60Q 1/34
(52) U.S. Cl. ....................... 340/475; 340/465; 340/476; 200/61.45 R; 200/61.52
(58) Field of Search ................................ 340/475, 463, 340/465, 466, 467, 468, 476, 477, 429, 427, 545.5; 200/61.45 R, 61.52, 61.27, 61.3, 61.31, 61.35, 61.58 R, 52 A, 433, 455, 514, 540, 541, 547, 565; 701/36; 180/282

(56) References Cited

U.S. PATENT DOCUMENTS

| | | | |
|---|---|---|---|
| 4,024,388 A | 5/1977 | Skoff | 362/467 |
| 4,030,066 A | 6/1977 | White | 340/476 |
| 4,058,797 A | 11/1977 | Sekiguchi et al. | 340/477 |
| 4,125,827 A * | 11/1978 | Roudebush, Jr. | 340/476 |
| 4,213,116 A | 7/1980 | Holtzman et al. | 340/476 |
| 4,333,071 A | 6/1982 | Kira et al. | 340/477 |
| 4,358,751 A * | 11/1982 | Roudebush, Jr. | 340/477 |
| 4,398,175 A | 8/1983 | Gamba | 340/476 |
| 4,403,211 A | 9/1983 | Shibata et al. | 340/476 |
| 4,658,236 A * | 4/1987 | Oka et al. | 340/476 |
| 4,792,785 A * | 12/1988 | Yukio et al. | 340/476 |
| 4,972,174 A | 11/1990 | Onan et al. | 340/477 |
| 5,442,332 A * | 8/1995 | Hughes | 340/467 |
| 5,777,290 A | 7/1998 | Tzanev | 200/61.52 |
| 5,811,656 A | 9/1998 | Jones | 73/1.75 |
| 6,304,804 B1 * | 10/2001 | DeBoni | 701/36 |

* cited by examiner

Primary Examiner—Jeffery Hofsass
Assistant Examiner—Toan Pham
(74) Attorney, Agent, or Firm—Young & Basile

(57) ABSTRACT

A self-cancelling turn signal mechanism for use with a vehicle such as a motorcycle turned primarily by tilting or banking into a turn. The self-cancelling turn signal mechanism includes an inertia switch with a continuous curved track and a contact-closing member freely slidable therein, sliding from a rest position in the center of the track to either end of the track when a true turn is initiated. The ends of the track and the inertia switch include contact members which, when contacted by the contact-closing member, deliver a turn-confirming signal to a control module which generates a simple time delay cancel signal to cancel a previously activated turn signal after a predetermined amount of time has elapsed.

6 Claims, 2 Drawing Sheets

1

TILT-ACTIVATED TURN SIGNAL SHUT-OFF FOR MOTORCYCLES

FIELD OF THE INVENTION

The present invention is in the field of automatic turn signal shut-off mechanisms, sometimes referred to as "self-cancelling" turn signals, in particular for motorcycles and similar vehicles which are banked or tilted into turns.

BACKGROUND OF THE INVENTION

Motorcycle turn signals are typically activated with manual switches. It is both draining on the battery and problematic for following motorists if the manually-activated turn signal remains on after the turn is completed. Various mechanisms have been proposed to automatically cancel the turn signal in response to the tilting of the vehicle as it is banked into a turn and/or upon its return to an upright position after a turn. However, such tilt-responsive turn signal switch control mechanisms have been subject to destabilizing factors such as vehicle vibration due to their mechanical design, or have suffered from having to rely on complicated measurements of turn "dynamics" such as counter-turning, distance, and velocity whose variations before, during, and after a turn are relatively complicated to monitor and which can negatively affect proper turn signal cancellation.

SUMMARY OF THE INVENTION

The present invention is a tilt-responsive turn signal cancelling mechanism which is vibration-proof, immune to false- or counter-turning effects, and unaffected by turn dynamics such as speed, direction, turn time, and turn completion. A movable contact-closing element such as a conductive ball or mass of mercury normally rests at the center or bottom of an arcuate tilt track or channel whose ends define left and right turn signal shut-off contacts. This inertia switch is connected to a turn signal control module which triggers a time-delayed shut-off to the corresponding turn signal. Because only the ends of the track define signal-generating contacts, the rest position of the contact-closing member at the center/bottom of the track and the intermediate length of the track are passive regions of rest or movement. The provision of a continuous passive track with signal shut-off contacts at the ends of the track eliminates false shut-off signals due to vibration, minor maneuvers, and counter-turning, since minor swings in the position of the contact-closing member from its rest position have no effect on the shut-off function.

The use of a simple time delay shut-off after the beginning of a turn is registered by the inertia switch further eliminates problems associated with monitoring turn dynamics throughout the turn.

These and other features and advantages of the invention will become apparent upon a further reading of the specification in light of the accompanying drawings.

DETAILED DESCRIPTION OF THE ILLUSTRATED EMBODIMENTS

Figure 1:
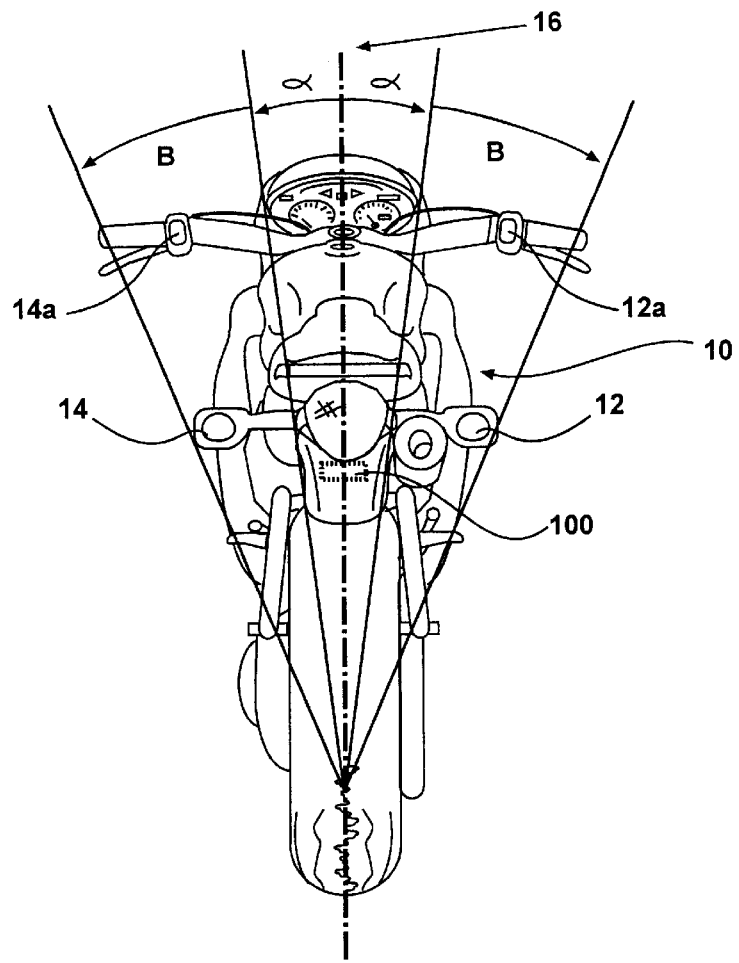
FIG. 1 illustrates a motorcycle in an upright position, with tilt angles indicating turns to right and left.

FIG. 1 schematically illustrates a motorcycle 10 in an upright position with its centerline 16 oriented vertically. It is well known that motorcycles, bicycles, and certain other types of vehicles (hereafter "motorcycles") are turned primarily by leaning or banking into a turn rather than by turning one or more wheels through a steering column as in a four-wheeled automobile. The intention to turn is signaled prior to a turn with either a right turn signal 12 or a left turn signal 14, actuated in known manner with one or more associated switch mechanisms 12a, 14a typically located on or near the handlebars. The turn signal actuating switches are manually operated by the motorcycle operator, and typically remain in the "on" position once activated until manually returned to an "off" position, or until some automatic apparatus cancels the signal.

Tilt-turning vehicles such as motorcycle 10 are constantly undergoing minor tilting to the left and right of centerline 16 as the operator adjusts and corrects balance, swerves slightly to avoid potholes or rocks, and makes other similar minor maneuvers which do not involve the sort of leaning or banking of motorcycle 10 needed to initiate and maintain a turn or sometimes a lane change. An exemplary range of minor maneuver banking is illustrated in FIG. 1 with the angle $\alpha$. When the centerline 16 of motorcycle 10 moves beyond the minor maneuver angle $\alpha$ into one of the regions denoted by angle $\beta$, it can be considered to be at a turning angle sufficient to have warranted a turn signal.

It will be understood by those skilled in the art that minor maneuver angle $\alpha$ and turning angle $\beta$ will vary depending on the particular motorcycle, bike, etc., and further that those skilled in the art may have different opinions as to where the minor maneuver/turning angle cutoff should be set with respect to a particular vehicle.

Figure 2:
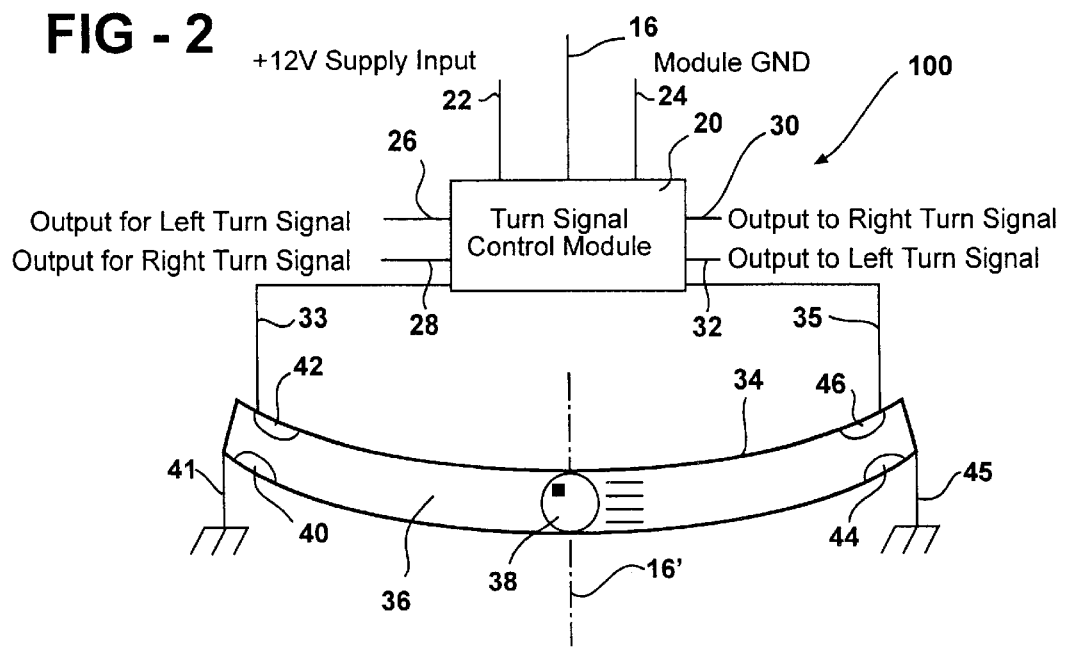
FIG. 2 illustrates a tilt-responsive self-cancelling turn signal system for the motorcycle of FIG. 1, according to the present invention.

Referring to FIG. 2, a self-cancelling mechanism 18 for the manually-activated turn signals is illustrated according to the present invention. The self-cancelling turn signal mechanism of FIG. 2 is adapted to be mounted on a vehicle such as motorcycle 10, ignoring minor maneuver tilting within angular range a, but initiating automatic cancellation of a turn signal when the motorcycle is tilted into a turning angle $\beta$. For this purpose, the mechanism 18 schematically illustrated in FIG. 2 can be conveniently mounted in a small plastic or metal housing at any convenient location on the motorcycle shown in FIG. 1, with simple wire inputs and outputs to turn signals 12 and 14 and turn signal switches 12a and 14a. One possible mounting location for the mechanism of FIG. 2 is the motorcycle frame. Other possible mounting locations will be readily apparent to those skilled in the art. The turn signal mechanism is aligned parallel with centerline 16 of motorcycle 10 when installed on the motorcycle.

The self-cancelling turn signal mechanism 18 comprises a turn signal control module 20 in the form of an integrated circuit microprocessor. Control module 20 receives a power supply input, typically 12 volts, through wire 22, and is connected to ground through wire 24. Control module 20 also receives a left turn signal command from left turn signal switch 14a through a wire 26, and a right turn signal command from right turn signal 12a through wire 28. Control module 20 responds to the input from the left and right turn signal switches (i.e., the switch has been turned "on") by generating a corresponding turn signal command to the corresponding turn signal through one of outputs 30 and 32. The command may be in the form of power sufficient to cause the corresponding turn signal to blink accordingly, or may simply close a switch or circuit to allow the delivery of power via another route to the appropriate turn signal. The turn signal will remain on until a "cancel" signal is received from control module 20 through one of the two output wires 30 or 32, for example when the manual switch 12a or 14a is moved to the "off" position.

Control module 20 monitors signals from an inertia switch 34 through input wires 33, 35 in a manner similar to its monitoring of manual turn signal switches 12a, 14a. Inertia switch 34 in the illustrated embodiment comprises an arcuate channel, cavity or track 36 containing a ball, roller, mercury blob or other tilt-responsive, movable contact-closing member 38 capable of rolling or sliding freely from the rest position shown aligned with centerline 16' to either end of track 36 where it closes the appropriate set of contacts 40, 42 or 44, 46. One end of the track contains left turn signal contacts 40 and 42, while the other end of the track contains right turn signal contacts 44 and 46. Contact-closing member 38 (in the illustrated embodiment a steel ball) is formed of a conductive material which electrically bridges the contacts to conduct current across them. The track itself is preferably formed from a non-conductive material such as a suitable polymer, and may have varying crosssectional shapes depending on the shape of the contact-closing member 38. In the illustrated embodiment, track 36 is a cylindrical tube containing steel ball 38.

Lower contacts 40 and 44 are connected to inputs 41 and 45 respectively, which are either positive voltage or ground connections, depending on the input needed by the turn signal control module circuitry. If, for example, the turn signal control module 20 uses a high side driver to generate the left and right turn signal outputs, then inertia switch inputs 41 and 45 will be connected to a positive voltage source. If a low side driver is used in the turn signal control module to generate the output to the left and right turn signals, then the inputs 41 and 45 in the inertia switch will be connected to ground so that a ground signal is sent to the control module when the contacts are closed. The upper left and right turn signal contacts 42 and 46 are connected by input wires 33 and 35, respectively, to the turn signal control module 20 which operates the left and right turn signal outputs accordingly.

When inertia switch 34 is tilted to the left, ball 38 rolls to the left and engages contacts 40 and 42, sending the appropriate signal to the control module 20. When the inertia switch is tilted to the right, ball 38 rolls right and engages contacts 44 and 46 to send an appropriate signal to the control module 20 to cancel the right turn signal. The degree of curvature of track 36 will vary according to the particular motorcycle and the minor maneuver and true turn angles α and β determined to be desirable for that particular motorcycle. In general, however, the length of track 36 and its curvature will be such that contact-closing member 38 has a significant range of movement between the contacts at either end so that nothing short of a true turn is likely to activate the inertia switch and trigger the cancel signal. Only after a sufficient tilt has been made to indicate a true turn will ball 38 make the appropriate signal-cancelling contact at one end of track 36.

It will be understood by those skilled in the art that "true turn" can include a lane change, which typically requires a turn signal.

Figure 3:
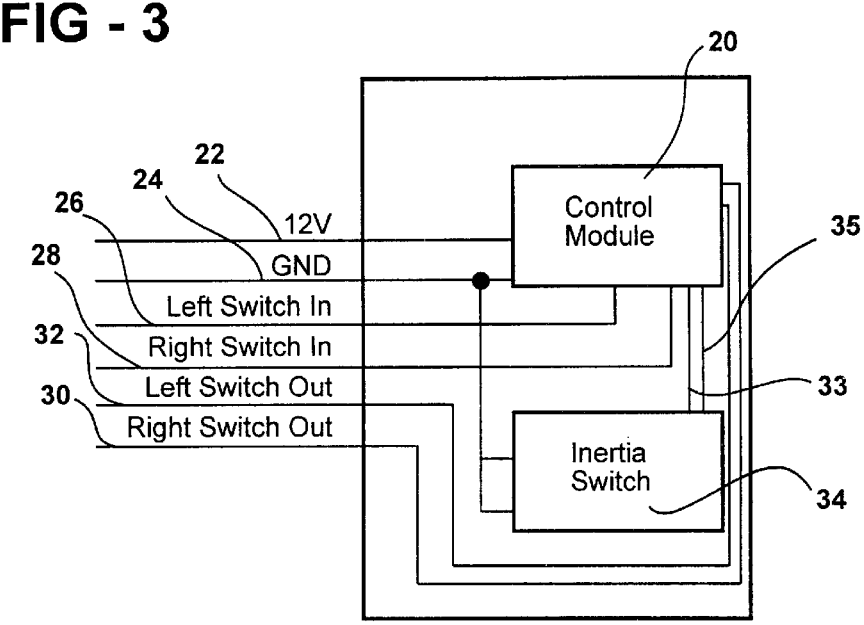
FIG. 3 is a schematic circuit diagram of the system of FIG. 2.

FIG. 3 is a schematic circuit diagram of the self-cancelling turn signal mechanism of FIG. 2, and uses the same reference numerals. It will be understood by those skilled in the art that although a ball and track inertia switch is illustrated in FIG. 2, inertia switch 34 can take other forms known to those skilled in the art. The particular example illustrated in FIG. 2 is believed to be inventive, especially the use of a continuous arcuate track with signal-generating contacts at the ends thereof, such that for the entire range of movement of the contact closing member between the ends of the track no signal is generated.

It will also be understood by those skilled in the art that the switch control module may take different physical forms. In a preferred form, switch control module 20 comprises an integrated circuit microprocessor. It could also take the form of a circuit board for more complicated processing, but such is not believed to be necessary for most applications. It is well within the capabilities of those skilled in the art to program an integrated circuit to carry out the various switching and signaling functions described above, and now further described below in flow chart form.

Figure 4:
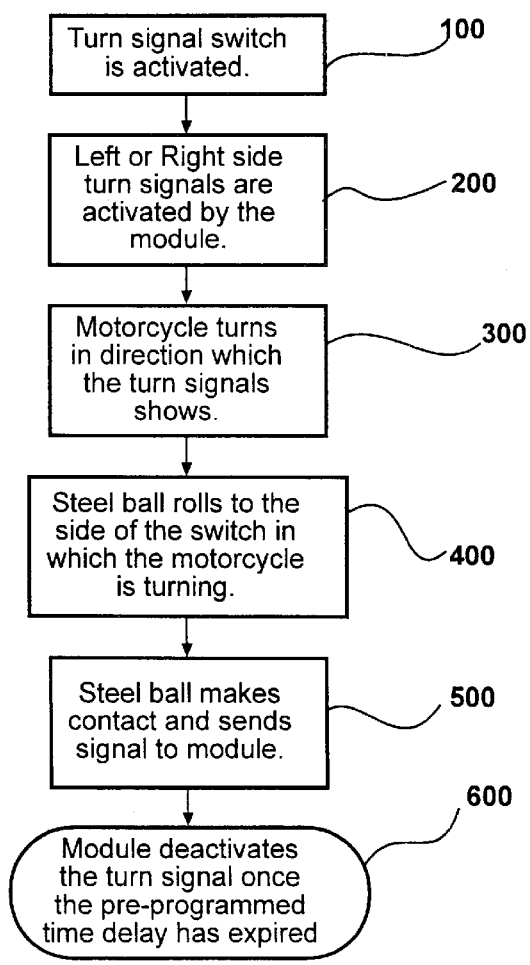
FIG. 4 is a process flow chart representing the sequential operation of the system of FIG. 2 after a turn signal switch has been activated by the motorcycle operator.

FIG. 4 is a flow chart of the process by which the self-cancelling turn signal mechanism of FIG. 2 operates in connection with turn signal activation and actual turning of the motorcycle. At step 100, the operator of the motorcycle manually activates the turn signal switch 12a or 14a depending on whether a left turn or right turn is being made. Activation of the manual turn signal switch sends a signal to control module 20 via one of the turn signal inputs 26 or 28, and the control module 20 in turn at step 200 generates an output at 30 or 32 to the appropriate turn signal to activate that turn signal. At step 300 the operator actually begins turning the motorcycle after having signaled the turn in the step immediately preceding. The turn will primarily involve a banking or tilting of the motorcycle from centerline 16 as illustrated in FIG. 1.

If the motorcycle tilts sufficiently to angle β, the contact closing member in the inertia switch will roll or slide to one end of the switch, thereby closing the appropriate contacts and sending a signal to control module 20 confirming that an actual turn has been initiated. During the period of initial, intermediate movement of the contact-closing member 38 in track 36 at step 400, no signal is sent to the control module. Not until the tilt is sufficient to send the contact-closing member to the end of the track and close the contacts is a signal sent to the module at step 500.

Whereas control module 20 enables the appropriate turn signal for an indefinite period of time in response to the manual turn signal switch, module 20 sends a short-delay turn signal shut-off via the appropriate output 30 or 32 after a turn has been confirmed by inertia switch 34. The time delay is predetermined to ensure that the turn signal continues at last partway into a turn before the signal is automatically turned off. The time delay selected can vary, but will generally be in the range of one to five seconds, for example.

Inertia switch 34 is designed to signal control module 20 that a turn has been made at the beginning or initiation of a turn, since the nature of the contact closure is momentary, and since the most important part of the turn to signal is the beginning of the turn.

A simple time delay begun at the moment of inertia switch contact, i.e. at the moment that a turn is initiated, guarantees that the signal will remain on at the moment of turning and through at least a major portion of the turn, but will automatically be cancelled toward the end of the turn or when the turn has been completed, depending on the predetermined time delay. Factors such as distance traveled, the speed of the motorcycle throughout the turn, various counter-turning measures which may be made after the turn is initiated, and other turn dynamics have no effect on the function of the self-cancellation procedure once triggered by the inertia switch. This makes the present self-cancelling turn signal mechanism immune to many of the factors addressed by prior devices.

It will be understood by those skilled in the art that the foregoing example of the inventive turn signal cancelling mechanism is susceptible of modification in many ways by those skilled in the art without departing from the scope of the invention. The foregoing description of an illustrated embodiment is not intended to limit the scope of the invention beyond that of the following claims. Accordingly, we claim:

1. In combination with a two wheeled vehicle which turns primarily by tilting or banking, the vehicle having left and right turn signals initially activated by a manual turn signal activating switch, a self-cancelling turn signal mechanism comprising:

a turn signal control module connected between the manual turn signal activating switch and the turn signals, a bank-sensing switch comprising a continuous, upwardly curved, electrically non-conductive track containing an electric- contact-closing member freely slidable in the track from one end of the track corresponding to the left turn signal to another end corresponding to the right turn signal when the track is tilted left or right in response to banking of the vehicle, each end of the track including contacts adapted to be closed by the contact-closing member, a first one of the contacts being connected to power or ground and a second one of the contacts being connected to the turn signal control module, the turn signal control module including means for generating a time delayed cancel signal to an activated one of the turn signals in response to the contact-closing member arriving at one end of the track corresponding to the activated turn signal and closing the contacts.

2. The mechanism of claim 1, wherein the bank-sensing switch track is curved such that the contact closing member reaches the contacts in the ends of the track only when a turn of predetermined degree is performed.

3. The mechanism of claim 1, wherein the contact-closing member is a conductive ball.

4. The mechanism of claim 1, wherein the means for generating a time-delayed cancel signal is responsive to a momentary closing of the contacts.

5. In combination with a two wheeled vehicle which turns primarily by banking, the vehicle having left and right turn signals initially activated by a manual turn signal activating switch, a self-cancelling turn signal mechanism comprising:

a switch responsive to left and right turn-initiating banking of the motorcycle to produce a momentary signal, and further including a control module connected to the switch to receive the banking signal and responsive thereto to send a time-delayed cancel signal to an activated one of the turn signals.

6. In combination with a two wheeled vehicle which turns primarily by tilting or banking, the vehicle having left and right turn signals initially activated by a manual turn signal activating switch, a self-cancelling turn signal mechanism comprising:

a turn signal control module connected between the manual turn signal activating switch and the turn signals, a bank-sensing switch comprising a continuous, upwardly curved, electrically non-conductive track containing an electric- contact-closing member freely slidable in the track from one end of the track corresponding to the left turn signal to another end corresponding to the right turn signal when the track is tilted left or right in response to banking of the vehicle, each end of the track including contacts adapted to be closed by the contact-closing member, the turn signal control module including means for generating a time delayed cancel signal to an activated one of the turn signals in response to the contact-closing member arriving at one end of the track corresponding to the activated turn signal and closing the contacts.

* * * * *